(12) United States Patent
Do

(10) Patent No.: US 9,835,053 B2
(45) Date of Patent: Dec. 5, 2017

(54) SELF-LUBRICATING BUSHINGS

(71) Applicant: UNITED TECHNOLOGIES CORPORATION, Farmington, CT (US)

(72) Inventor: Logan H. Do, Canton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 317 days.

(21) Appl. No.: 14/623,320

(22) Filed: Feb. 16, 2015

(65) Prior Publication Data

US 2016/0356178 A1  Dec. 8, 2016

Related U.S. Application Data

(60) Provisional application No. 61/943,089, filed on Feb. 21, 2014.

(51) Int. Cl.
| | | |
|---|---|---|
| *F01D 25/18* | (2006.01) | |
| *F01D 9/04* | (2006.01) | |
| *F01D 17/16* | (2006.01) | |
| *F01D 25/16* | (2006.01) | |

(52) U.S. Cl.
CPC .............. *F01D 25/18* (2013.01); *F01D 9/041* (2013.01); *F01D 17/162* (2013.01); *F01D 25/16* (2013.01); *F05D 2220/32* (2013.01); *F05D 2240/12* (2013.01); *F05D 2240/50* (2013.01); *F05D 2260/98* (2013.01)

(58) Field of Classification Search
CPC ........ F01D 25/18; F01D 9/041; F01D 17/162; F01D 25/16; F01D 25/125; F01D 25/166; F01D 17/16; F01D 17/165; F01D 9/047; F05D 2220/32; F05D 2240/12; F05D 2240/50; F05D 2260/98; F05D 2250/36; F05D 2260/79; F05D 2300/509
USPC ......................... 415/159–162, 229; 416/174
See application file for complete search history.

(56) References Cited

U.S. PATENT DOCUMENTS

| | | | | |
|---|---|---|---|---|
| 1,936,894 A | * | 11/1933 | Whiteley | .............. F16C 33/102 384/286 |
| 2,067,034 A | * | 1/1937 | Whiteley | .............. F16C 33/103 384/292 |
| 7,320,549 B2 | * | 1/2008 | Kubota | ................... F16C 17/02 384/283 |
| 2008/0206045 A1 | * | 8/2008 | Foucher | ............... F01D 17/162 415/160 |

* cited by examiner

*Primary Examiner* — Kenneth Bomberg
*Assistant Examiner* — Brain Delrue
(74) *Attorney, Agent, or Firm* — Cantor Colburn LLP

(57) ABSTRACT

A bushing includes a cylindrical bushing body with a lubricant aperture and a dry lubrication source. The bushing defines a main bushing bore therethrough along a longitudinal axis. The lubricant aperture is defined in the bushing body along an angle relative to the longitudinal axis. The dry lubrication source is disposed in the lubricant aperture. A variable vane system includes a cylindrical case, a plurality of vanes projecting radially inward from the case, and a plurality of bushings. Each vane includes a respective vane stem operatively connecting an end of each vane to the case. Each bushing is disposed on one of the respective vane stems between the vane stem and the case. The respective vane stem is disposed within the main bushing bore and each bushing is slidingly engaged with the case.

14 Claims, 3 Drawing Sheets

SELF-LUBRICATING BUSHINGS

CROSS-REFERENCE TO RELATED APPLICATION

This application claims the benefit of priority under 35 U.S.C. §119(e) to U.S. Provisional Application No. 61/943,089, filed Feb. 21, 2014, which is incorporated herein by reference in its entirety.

BACKGROUND OF THE INVENTION

1. Field of the Invention

The present disclosure relates to bushings, and more particularly to bushings such as in variable vane systems.

2. Description of Related Art

Traditionally, a turbo fan engine for an aircraft includes multiple stages of variable vanes to condition and guide airflow through the compressor and/or turbine sections. Variable vanes are configured to be pivoted about their vane axis in order to optimize airflow characteristics for various operating conditions.

It is known that variable vanes can be connected to a synchronization ring (sync ring), each by a respective vane arm connected to the stem of the vane. The sync ring can drive each vane counter-clockwise and/or clockwise around its respective longitudinal axis in order to set the optimal vane stage angle for a particular operating condition. Each vane stem is surrounded by a respective bushing and each bushing is operatively connected to a cylindrical case. The vane stems rub against the bushing inner surface and can cause wear at the interface. Material degradation, engine vibration and bearing stress can further induce bearing wear, such as surface galling, erosion, fretting, and the like. Eventually, the bearing wear can necessitate maintenance and/or replacement of worn components.

Such conventional methods and systems have generally been considered satisfactory for their intended purpose. However, there is still a need in the art for bushings that allow for improved durability and wear resistance. The present disclosure provides a solution for these problems.

SUMMARY OF THE INVENTION

A bushing includes a cylindrical bushing body with a lubricant aperture and a dry lubrication source. The bushing defines a main bushing bore therethrough along a longitudinal axis. The lubricant aperture is defined in the bushing body along an angle relative to the longitudinal axis. The dry lubrication source is disposed in the lubricant aperture.

It is contemplated that the lubricant aperture can be disposed on an outer diameter surface of the bushing body. The lubricant aperture can extend radially inward from the outer diameter surface along an aperture axis, wherein the aperture axis is normal to the outer diameter surface of the bushing body. The lubricant aperture can extend from an outer diameter surface of the bushing body and into the main bushing bore. It is contemplated that the lubricant aperture can be cylindrical.

In addition, the bushing body can include at least one additional lubricant aperture. Each additional lubricant aperture can be similar to the lubricant aperture described above. The lubricant apertures can be arranged in a geometric array on the bushing body, such as a staggered geometric array. The bushing body can include a metallic material, such as nickel, cobalt and/or any other suitable high strength material. The dry lubrication source can include a polymer, for example epoxy, and/or polyimide, and/or graphite. The bushing body can also include a connecting bore extending from an end surface of the bushing body in a longitudinal direction with respect to the longitudinal axis connecting together at least two of the lubricant apertures.

A variable vane system includes a cylindrical case and a plurality of vanes. The plurality of vanes project radially inward from the case. Each vane includes a respective vane stem operatively connecting an end of each vane to the case. A respective bushing, as described above, is disposed on each one of the respective vane stems between the vane stem and the case. The respective vane stems is disposed within the respective main bushing bore and each bushing is slidingly engaged with the case.

An inner diameter surface of each bushing can be press-fit around one of the respective vane stems. The plurality of bushings can be a plurality of primary bushings. The system can also include a plurality of secondary bushings. Each secondary bushing can have an outer diameter surface operatively connected to the case and an inner diameter surface slidingly engaged with an outer diameter of one of the primary bushings. The outer diameter surface of each secondary bushing can be press-fit within a respective one of a plurality of cavities within the case. Both the primary and secondary bushing bodies can include materials similar to those described above with respect to the bushing body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
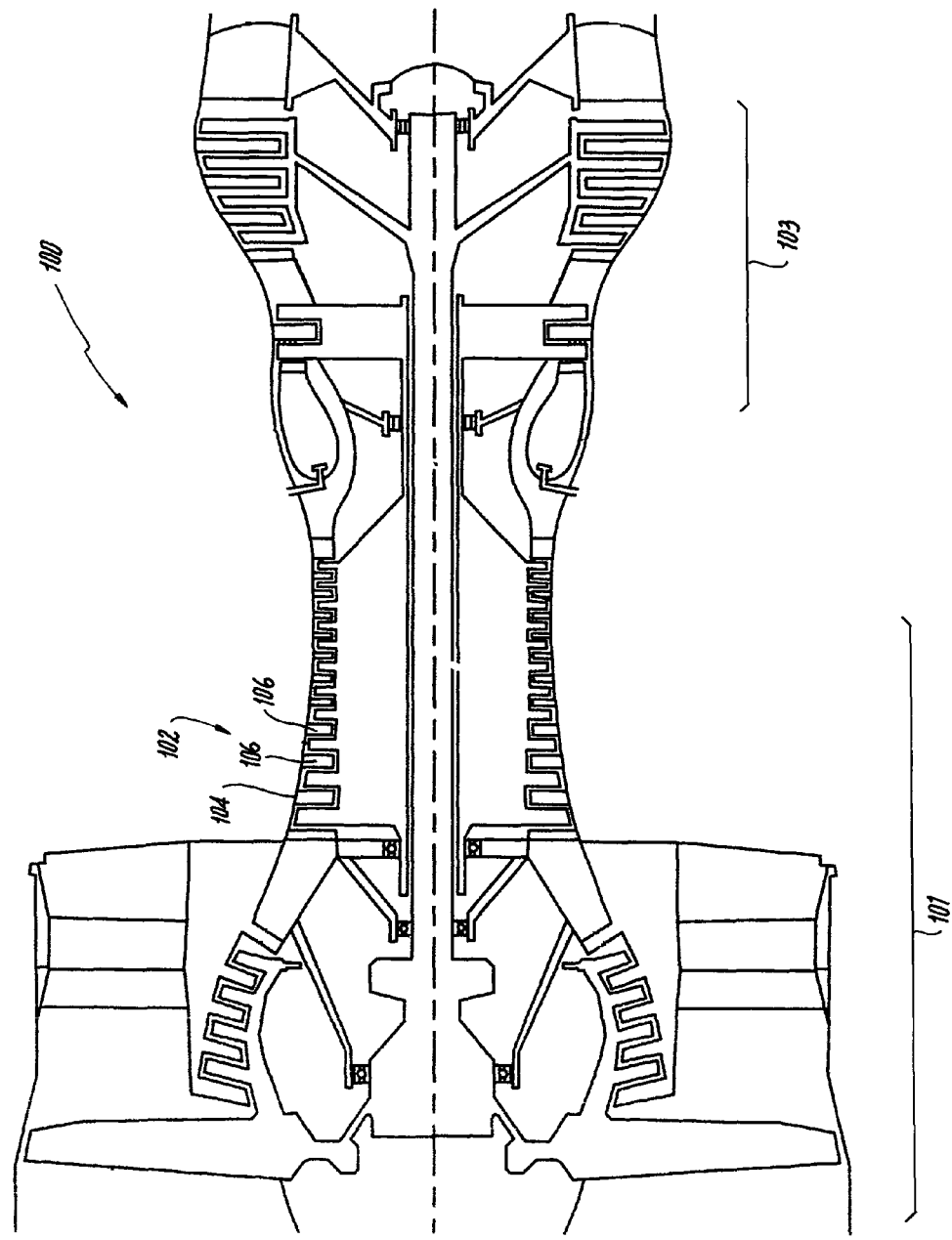
FIG. 1 is a schematic cross-sectional side elevation view of an exemplary embodiment of a gas turbine engine constructed in accordance with the present disclosure.

Reference will now be made to the drawings wherein like reference numerals identify similar structural features or aspects of the subject disclosure. For purposes of explanation and illustration, and not limitation, a cross-sectional view of an exemplary embodiment of a gas turbine engine constructed in accordance with the disclosure is shown in FIG. 1 and is designated generally by reference character 100. Other embodiments of gas turbine engines constructed in accordance with the disclosure, or aspects thereof, are provided in FIGS. 2-4, as will be described.

As shown in FIG. 1, a variable vane system 102 includes a cylindrical case 104 and a plurality of vanes 106. Variable vane system 102 is disposed in a compressor section 101 of gas turbine engine 100. Vanes 106 are stator vanes and project radially inward from case 104. Those skilled in the art will also readily appreciate that variable vane system 102 can be used in any other suitable application.

Figure 2:
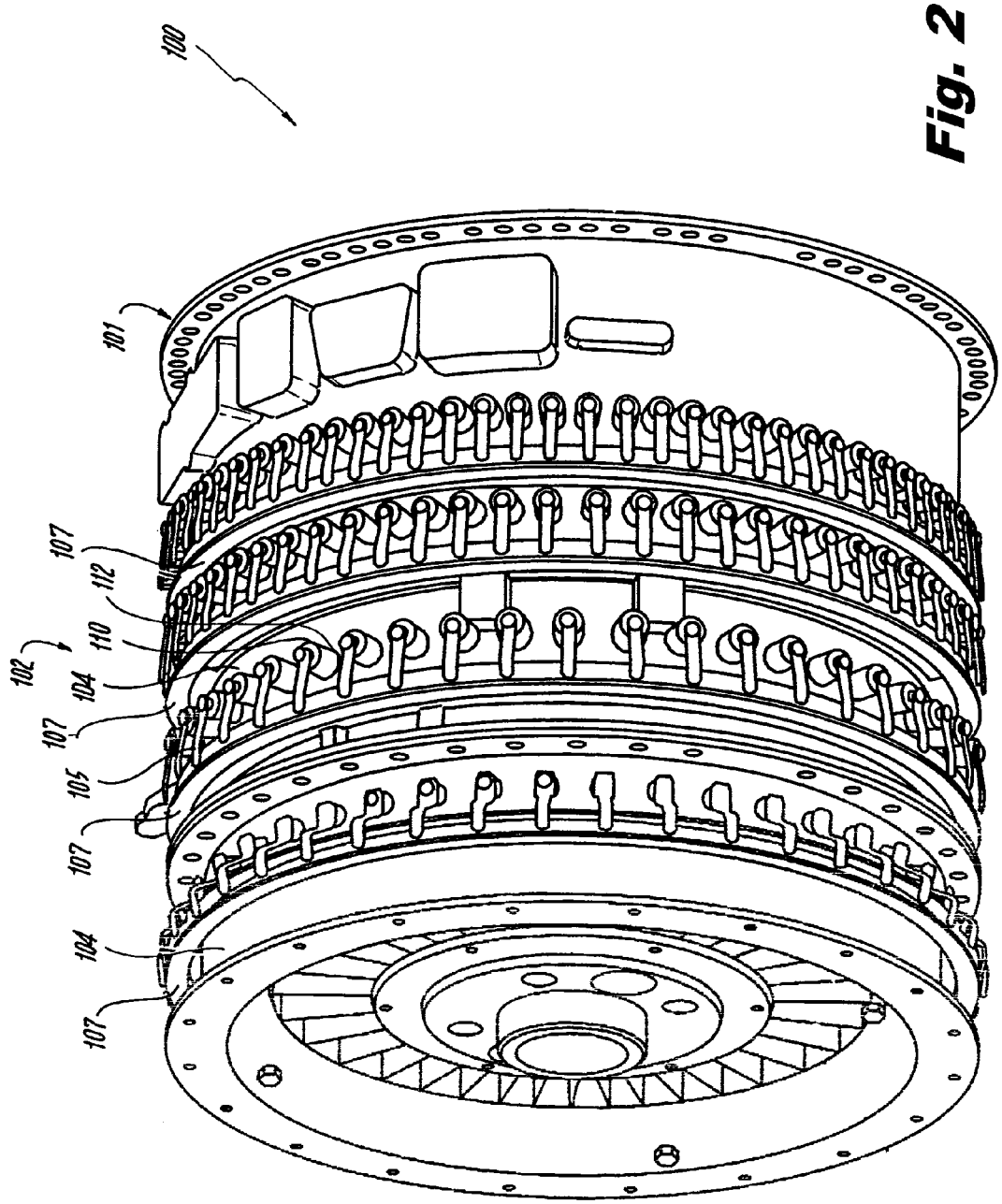
FIG. 2 is a schematic partial perspective view of a portion of the gas turbine engine shown in FIG. 1, showing the engine case surrounding the compressor.
Figure 3:
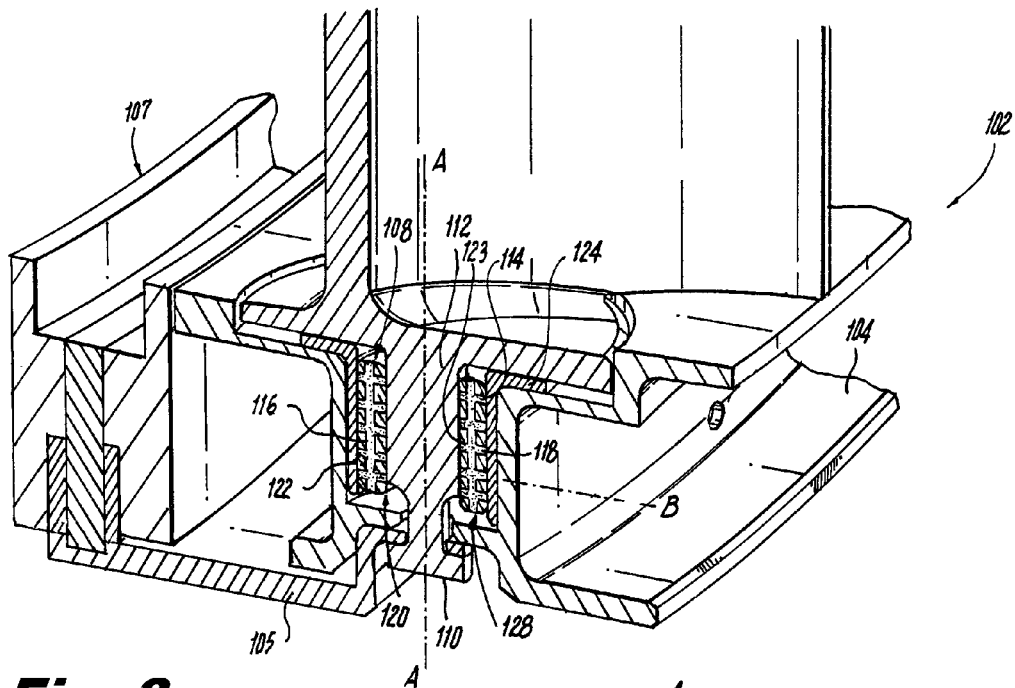
FIG. 3 is a is cross-sectional view of a portion of the variable vane system of the gas turbine engine shown in FIG. 1, showing the engine case, a vane, the vane stem and bushings.

As shown in FIGS. 2 and 3, each vane 106 includes a respective vane stem 110 operatively connecting an end 112 of each vane 106 to case 104. Vane arms 105 connect each respective vane stem 110 to a respective synchronization ring 107 (sync ring). Those skilled in the art will readily appreciate that variable vane system 102 can include multiple stages of variable vanes 106, each stage with a respective sync ring 107, throughout case 104. Those skilled in the art will also readily appreciate that variable vanes 106 are driven by sync ring 107 rotating counter-clockwise and clockwise and around case 104, as needed, to adjust the vane angle of attack for all of vanes 106 associated with respective sync ring 107, e.g. to optimize engine operability.

With reference to FIG. 3, system 102 includes a plurality of bushings 108. While only one bushing 108 is shown in FIG. 3, those skilled in the art will readily appreciate that each vane 106, e.g. vanes 106 shown in FIG. 1, has a respective bushing 108 similar to that shown in FIG. 3. Each bushing 108 includes a cylindrical bushing body 116 with lubricant apertures 114 and a dry lubrication source 118. Each bushing 108 defines a main bushing bore 120 therethrough along a longitudinal axis A. Each bushing 108 is disposed a respective vane stem 110, between the vane stem 110 and case 104. Inner diameter surface 123 of each bushing 108 is press-fit around the respective vane stem 110. Vane stem 110 is disposed within main bushing bore 120 and each bushing 108 is slidingly engaged with case 104 for relative rotation with respect to case 104.

With continued reference to FIG. 3, lubricant apertures 114 are defined within bushing body 116 along an angle relative to longitudinal axis A. Dry lubrication source 118 is disposed in each lubricant aperture 114. Lubricant apertures 114 are disposed on an outer diameter surface 122 of bushing body 116, and each extend radially inward from the outer diameter surface 122 along a respective aperture axis B (only one of which is identified in FIG. 3 for sake of clarity), wherein aperture axis B is normal to outer diameter surface 122 of bushing body 116. Lubricant apertures 114 extend from outer diameter surface 122 of bushing body 116 to an inner diameter surface 123 of bushing body 11, e.g. into main bushing bore 120. Outer diameter surface 122 is radially opposed to inner diameter surface 123 across bushing body 116. Lubricant aperture 114 is cylindrical, however any other suitable aperture cross-sections can be used.

While aperture axis B is shown and described herein as being normal to outer diameter surface 122 of bushing body 116, those skilled in the art will readily appreciate that lubricant apertures 114 can be defined at any suitable angles with respect to outer diameter surface 122 of bushing body 116. Further, while lubricant apertures 114 are described and shown herein as extending from outer diameter surface 122 of bushing body 116 to inner diameter surface 123 of bushing body 116, it is contemplated that lubricant apertures could extend from outer diameter surface 122 of bushing body 116 toward inner diameter surface 123, but stop therebetween in the bushing body 116 and not reach inner diameter surface 123.

Figure 4:
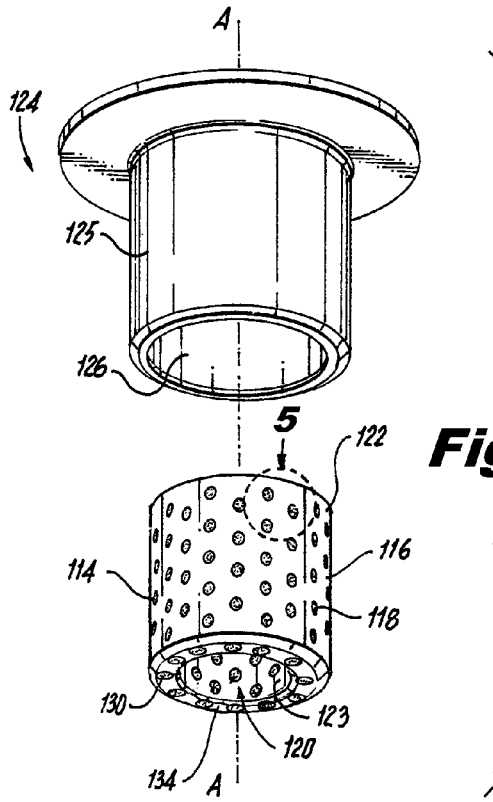
FIG. 4 is an exploded perspective view of an exemplary embodiment of primary and secondary bushings constructed in accordance with the present disclosure, showing the lubricant apertures.

With reference now to FIGS. 3 and 4, bushings 108 are primary bushings. The system also includes a plurality of secondary bushings 124. Each secondary bushing 124 has an outer diameter surface 125 operatively connected to case 104 and an inner diameter surface 126 slidingly engaged with an outer diameter surface 122 of one of primary bushings 108, for relative rotation of primary bushing 108 with respect to secondary bushing 124. Outer diameter surface 125 of each secondary bushing 124 is press-fit within a respective one of a plurality of cavities 128 within case 104. Those skilled in the art will readily appreciate that secondary bushings 124 can include materials similar to those described above with respect to primary bushing body 108.

With continued reference to FIGS. 3 and 4, each primary bushing 108 rotates along with the respective vane stem 110 upon actuation from synch ring 107, described above with respect to FIG. 2. During rotation of primary bushing 108, outer diameter surface 122 of primary bushing 108 slides against inner diameter surface 126 of secondary bushing 124. When primary busing 108 is under this sliding load, embedded dry material from lubrication source 118 in lubricant apertures 114 will slowly be ground off and become tiny particles which serve as a lubrication powder for the interface between outer diameter surface 122 and inner diameter surface 126. Those skilled in the art will readily appreciate that during manufacturing, dry lubrication source 118 can be embedded into lubricant apertures 114 in liquid form, then dry to form dry lubrication source 118, for example.

Figure 5:
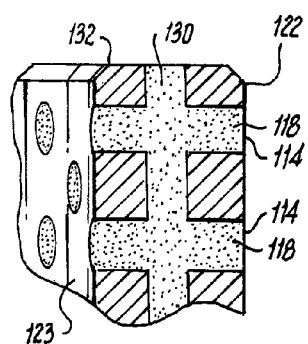
FIG. 5 is an enlarged cross-sectional view of the primary bushing of FIG. 5, showing the lubricant apertures with a dry lubricant source disposed therein.

As shown in FIGS. 4 and 5, bushing body 116 can also include connecting bores 130 extending from an end surface 132 of bushing body 116 in a longitudinal direction with respect to longitudinal axis A connecting together at least two lubricant apertures 114 in a particular axial row of lubricant apertures 114. Dry lubrication source 118 is disposed in connecting bores 130. Connecting bores 130 extend parallel to longitudinal axis A from end surface 132 of bushing body 116 to an opposing end surface 134 of bushing body 116. Connecting bores 130 are cylindrical, however any other suitable bore cross-sections can be used.

Those skilled in the art will readily appreciate that connecting bores 130 act as a retention mechanism to ensure that lubrication source 118 is secured in lubricant apertures 114 while bushing assembly is being assembled and disassembled. While connecting bores 130 are shown and described herein as each extending from end surface 132 to an opposing end surface 134, those skilled in the art will readily appreciate that connecting bores 130 can stop at any point there between. In addition, while a particular axial row of lubricant apertures 114 is shown and described herein as having a single connecting bore 130 connecting all lubricant apertures 114 in that particular row, those skilled in the art will readily appreciate that there can be multiple connecting bores 130 connecting different lubricant apertures 114 of the same axial row.

With continued reference to FIGS. 4 and 5, lubricant apertures 114 are arranged in a geometric array on bushing body 116, namely a staggered geometric array, i.e. where axial rows of apertures 114 are staggered relative to their circumferential adjacent neighboring rows. It is contemplated that bushing body 116 can include a metallic material, such as nickel and/or cobalt. Those skilled in the art will readily appreciate that dry lubrication source 118 can be a polymer material, such as bismaleimide (BMI), epoxy, a polyimide, and/or any other suitable polymer. It is also contemplated that dry lubrication source 118 can be graphite, and/or any other suitable material. Those skilled in the art will also readily appreciate that bushing body 108 can include lubricant apertures 114 arranged in any other suitable geometric array as needed for a given application. In addition, those skilled in the art will readily appreciate that bushings 108 can be made with any suitable materials, both metal and composite.

Those skilled in the art will readily appreciate that lubricant apertures 114 and dry lubrication source 118 embedded therein act to minimize bearing stress and reduce wear, as compared with traditional metal bushings. This tends to reduce the wear to which traditional high compressive strength metal bushings can be vulnerable, particularly in elevated temperature environments.

The methods and systems of the present disclosure, as described above and shown in the drawings, provide for bushings and variable vane systems with superior properties including improved wear resistance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A self-lubricating bushing for variable vanes of a gas turbine engine, comprising:
   a cylindrical bushing body defining a main bushing bore therethrough along a longitudinal axis, wherein the bushing body includes a lubricant aperture extending radially from the main bushing bore, and the lubricant aperture extends from an outer diameter surface of the bushing body and into the main bushing bore;
   a dry lubrication source disposed in the lubricant aperture, wherein the bushing body includes at least one additional lubricant aperture extending from the outer diameter surface of the bushing body and into the main bushing bore, wherein each additional lubricant aperture also includes a dry lubrication source disposed therein; and
   a connecting bore located within the cylindrical bushing body and spaced from the outer diameter surface of the bushing body and an inner diameter surface of the bushing body, the connecting bore extending from an end surface of the bushing body in a longitudinal direction with respect to the longitudinal axis connecting together the lubricant aperture and the at least one additional lubricant aperture.

2. A bushing as recited in claim 1, wherein the lubricant aperture extends radially inward from the outer diameter surface along an aperture axis, wherein the aperture axis is normal to the outer diameter surface of the bushing body.

3. A bushing as recited in claim 1, wherein the lubricant aperture is cylindrical.

4. A bushing as recited in claim 1, wherein the lubricant aperture and the at least one additional lubricant aperture are a plurality of apertures are arranged in a geometric array on the bushing body.

5. A bushing as recited in claim 4, wherein the geometric array is a staggered geometric array.

6. A bushing as recited in claim 1, wherein the bushing body comprises a metallic material.

7. A bushing as recited in claim 1, wherein the dry lubrication source includes a dry lubricant material selected from the group consisting of polymer and graphite.

8. A variable vane system, comprising:
   a cylindrical case;
   a plurality of vanes projecting radially inward from the case, wherein each vane includes a respective vane stem operatively connecting an end of each vane to the case; and
   a plurality of bushings, each bushing including:
      a cylindrical bushing body defining a main bushing bore therethrough along a longitudinal axis, wherein the bushing body includes a lubricant aperture extending radially from the main bushing bore, and the lubricant aperture extends from an outer diameter surface of the bushing body and into the main bushing bore; and
      a dry lubrication source disposed in the lubricant aperture, wherein the bushing body includes at least one additional lubricant aperture extending from the outer diameter surface of the bushing body and into the main bushing bore, wherein each additional lubricant aperture also includes a dry lubrication source disposed therein; and
      a connecting bore located within the cylindrical bushing body and spaced from the outer diameter surface of the bushing body and an inner diameter surface of the bushing body, the connecting bore extending from an end surface of the bushing body in a longitudinal direction with respect to the longitudinal axis connecting together the lubricant aperture and the at least one additional lubricant aperture, wherein one of the plurality of bushings is disposed on each one of the respective vane stems between the vane stem and the case, wherein the respective vane stem is disposed within the respective main bushing bore and wherein each bushing is slidingly engaged with the case.

9. A system as recited in claim 8, wherein the inner diameter surface of each bushing is press-fit around one of the respective vane stems.

10. A system as recited in claim 8, further comprising a plurality of secondary bushings, wherein the plurality of bushings are a plurality of primary bushings, wherein each secondary bushing has an outer diameter surface operatively connected to the case and an inner diameter surface slidingly engaged with the outer diameter surface of one of the primary bushings.

11. A system as recited in claim 10, wherein the outer diameter surface of each secondary bushing is press-fit within a respective one of a plurality of cavities within the case.

12. A system as recited in claim 8, wherein the lubricant aperture is disposed on the outer diameter surface of the bushing body.

13. A system as recited in claim 12, wherein the lubricant aperture extends radially inward from the outer diameter surface along an aperture axis, wherein the aperture axis is normal to the outer diameter surface of the bushing body.

14. A system as recited in claim 8, wherein the lubricant aperture is cylindrical.

* * * * *